April 14, 1970 R. N. MELLOTT 3,506,853

SELECTION DEVICE

Original Filed July 18, 1963 3 Sheets-Sheet 1

INVENTOR.
ROBERT N. MELLOTT

SELECTION DEVICE

Original Filed July 18, 1963 3 Sheets-Sheet 2

INVENTOR.
ROBERT N. MELLOTT

SELECTION DEVICE

Original Filed July 18, 1963 3 Sheets-Sheet 3

INVENTOR
ROBERT N. MELLOTT 3,506,853
SELECTION DEVICE

Robert N. Mellott, Palos Verdes Estates, Calif., assignor to The Bunker-Ramo Corporation, Canoga Park, Calif., a corporation of Delaware Original application July 18, 1963, Ser. No. 296,001. Divided and this application Dec. 30, 1966, Ser. No. 606,351
Int. Cl. H03k *17/74;* G06f *7/02*
U.S. Cl. 307—259 6 Claims

ABSTRACT OF THE DISCLOSURE

An amplitude selection device including a bleeder supply with series diodes and a plurality of transistors with their emitters connected to the junction between respective diodes and wherein input signals applied to the bases will result in shunting bleeder current through a respective transistor to the exclusion of the others thereby providing a selected output.

Figures 1, 1A:
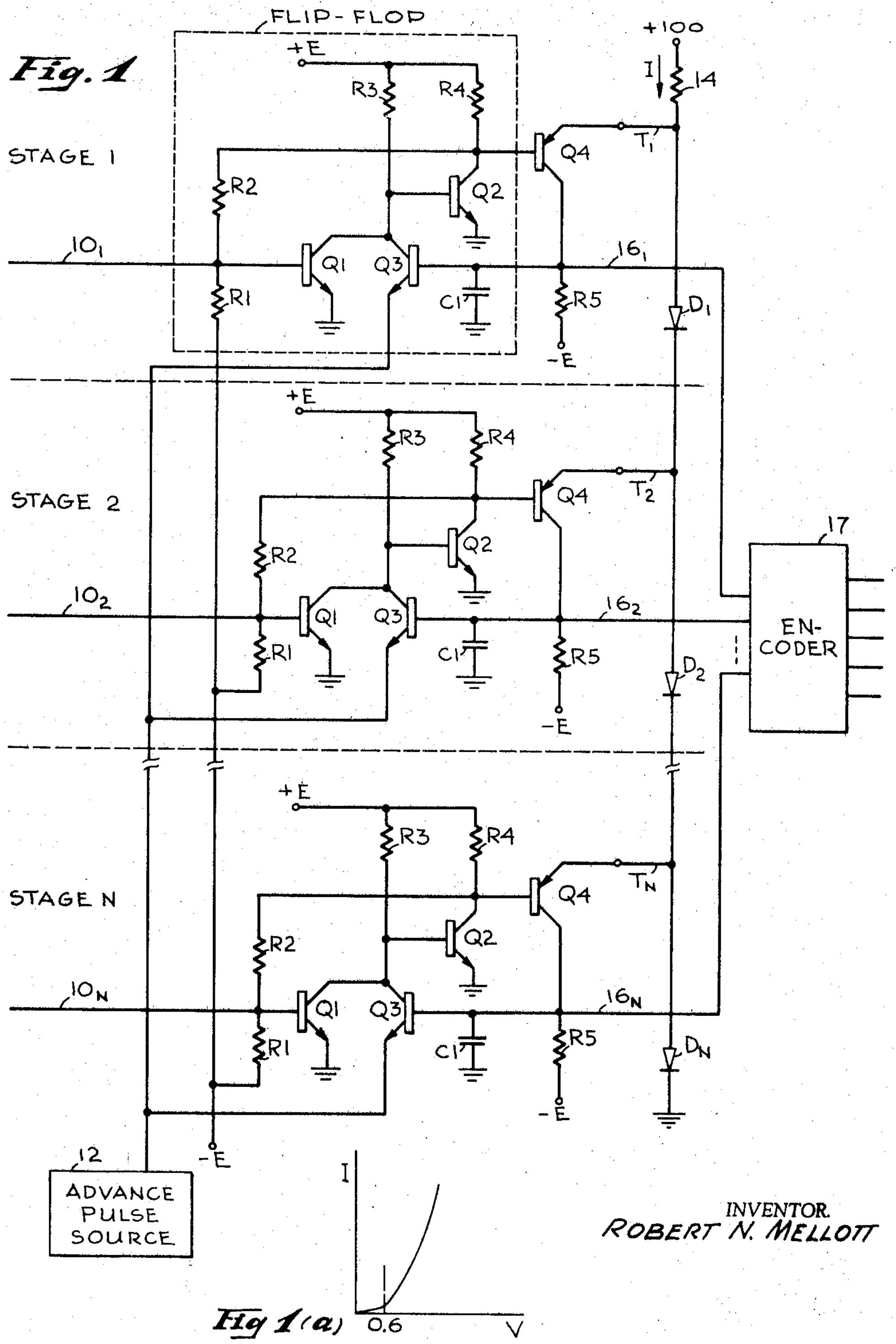

This application is a division of U.S. patent application Ser. No. 296,001, filed on July 18, 1963, by Robert N. Mellott.

This invention relates generally to data processing apparatus and more particularly to a selection device for use with a plurality of binary elements, respectively arbitrarily numbered 1, 2, 3 . . . N for seeking out and selecting the lowest numbered element in a given state and finds particularly utility in monitoring a plurality of conductors.

For purposes of illustration and explanation, the invention herein will be described in connection with binary digital data processing apparatus but it is specifically pointed out that the term "binary" is used only in the sense that two different broad classes of manifestations are contemplated. For example, the two possible values of a binary manifestation can be respectively represented by the presence and absence of an electrical pulse but in addition the two values can be respectively represented by the presence and absence of an electrical pulse having predetermined and very precise characteristics.

In many diverse digital data processing systems, a bank of binary elements is provided with each element being connected to a different conductor so as to sense a binary signal therein, which can be manifested by the presence or absence of a pulse of a predetermined characteristic and can be representative of the occurrence or nonoccurrence of a different condition. The binary element can be made to assume a true state, for example, in response to the presence of said pulse. It is often desired to be able to examine the respective states of the various elements at the end of a certain time interval in order to determine which elements were switched to the true state or alternatively which elements remained in the false state. Although straightforward communication techniques can be used to sequentially sample each element, this procedure is often unnecessarily slow, particularly where the number of elements assuming the sought state is small compared to the total number of elements in the bank.

This latter situation often arises, for example, in the use of digital memories of the type disclosed in U.S. Patent No. 3,031,650 which can appropriately be considered a content addressable memory inasmuch as its storage locations are addressed or selected on the basis of the contents stored therein rather than on the basis of some arbitrarily assigned address. Such a memory permits all of the memory storage locations to be simultaneously searched to determine whether any of the words stored therein are identical to a search word being sought. A different word line is associated with all of the storage elements of each storage location and for each bit of any stored word which mismatches the corresponding bit of the search word, a pulse is provided on the word line associated with the location containing the dissimilar bit. (Of course, in an alternative embodiment, pulses can be provided to represent a match situation.) Each word line can have a different binary element connected thereto which can be switched to a true state in response to the presence of one or more pulses on the associated word line. At the end of a search period, it is described to examine all elements to determine which ones, if any, remained in the false state. A binary element remaining in the false state would, of course, indicate that all of the bits stored in the associated storage location are respectively identical to the corresponding bits of the search word. In addition to merely determining which binary elements remained in the false state, it is sometimes desirable to make these determinations sequentially in order to permit this information to be conventionally utilized to subsequently readout, write in, or modify the same or other information in the same or another memory.

Inasmuch as the number (M) of binary elements remaining in the false state for most contemplated applications of a content addressable memory will be extremely small compared to the number (N) of the binary elements which are switched to the true state, it is desirable to avoid the utization of conventional time consuming commutation techniques to sequentially sample each of the elements.

In view of this, it is an object of the present invention to provide a selection device for use with a plurality of binary elements respectively arbitrarily numbered 1, 2, 3 . . . N for seeking out and selecting the lowest numbered element in a given state.

More particularly, it is an object of this invention to provide such a selection device which can select the lowest numbered element in a given state in the same finite time period regardless of which particular element is, in fact, the lowest numbered in said given state.

It is a still further object of this invention to provide such a selection device which can sequentially select each of the M binary elements, of a total number of N binary elements, in a given state in M finite time periods regardless of which M elements are in said given state.

It is a still further object of this invention to provide such a selection device including a number (P) of segments connected in tandem, each segment including N/P binary elements, such that in addition to each of the M binary elements in a given state being sequentially selected, each of the segments containing any binary elements in said given state is sequentially selected.

To a great extent, the above objects are achieved by an invention disclosed in U.S. patent application, Ser. No. 296,053, entitled "Selection Device," filed on July 18, 1963, by Ralph J. Koerner and Edward J. Schneberger and assigned to the same assignee as this present application. The invention disclosed herein presents a different and unique hardware approach from that disclosed in the Koerner et al. application to arrive at functionally similar results.

Briefly, the invention herein is based on the recognition that current can be steered out of a series circuit comprised of a plurality of similarly poled unidirectional current conducting elements respectively defining circuit junctions between adjacent elements and into only one of a plurality of taps respectively connected to the circuit junctions. Each tap is biased by a different binary element, by establishing a voltage between adjacent taps, responsive to conduction through one of the taps, which is insufficient to forward bias the unidirectional element therebetween.

In a preferred embodiment of the invention, a series circuit including N stages, each stage including a diode is connected between a positive potential source and ground to permit current to be driven through the similarly poled diodes. A tap is connected to the anode of each of the diodes in the series circuit. A different transistor switch is respectively connected to each of the taps. Each transistor switch is in turn biased by a different one of a plurality of binary elements. When the binary elements are in a first or false state, the transistor switches are so biased as to tend to permit current flow therethrough from the series circuit through the tap to which it is connected. On the other hand, when the binary elements are in a second or true state, they respectively off bias the transistor switches to which they are connected.

A current diverted through any one of the taps establishes the potential of the anode to which it is connected slightly above ground. Since the cathode of the same stage is connected to the anode of the next stage (i.e., further displaced from the positive potential source) which may also have a tap connected to a forward biased transistor switch, the potential difference between the anode and cathode of the stage through which the current is diverted is not sufficient to forward bias the diode and consequently substantially no current enters the tap of the next stage.

The current diverted through the one tap and its associated transistor switch constituting an output circuit can be utilized to write in or read out information into a content addressable memory or some other memory. On the other hand, it can be used merely to appropriately energize an encoding circuit to generate signals representative of an address code identifying the selected binary element. In addition to finding utility for such external functions, the diverted current can be utilized to appropriately steer an "advance pulse" applied to all of the binary elements to cause only the selected binary element to be switched to its second state. As a consequence of switching the selected binary element to a second state, the current in the series circuit will then be diverted through the tap connected to the next stage. In this manner, M binary elements in a given state of a total number of N such elements can be sequentially selected in M finite time periods.

Although the selection device disclosed herein finds particular utility in conjunction with content addressable memories, it additionally can be advantageously employed wherever a plurality of conductors, on which signals having predetermined characteristics can randomly appear, are to be monitored. For example only, the selection device can be used to monitor a plurality of telephone lines which are randomly and possibly simultaneously energized.

Figure 2:
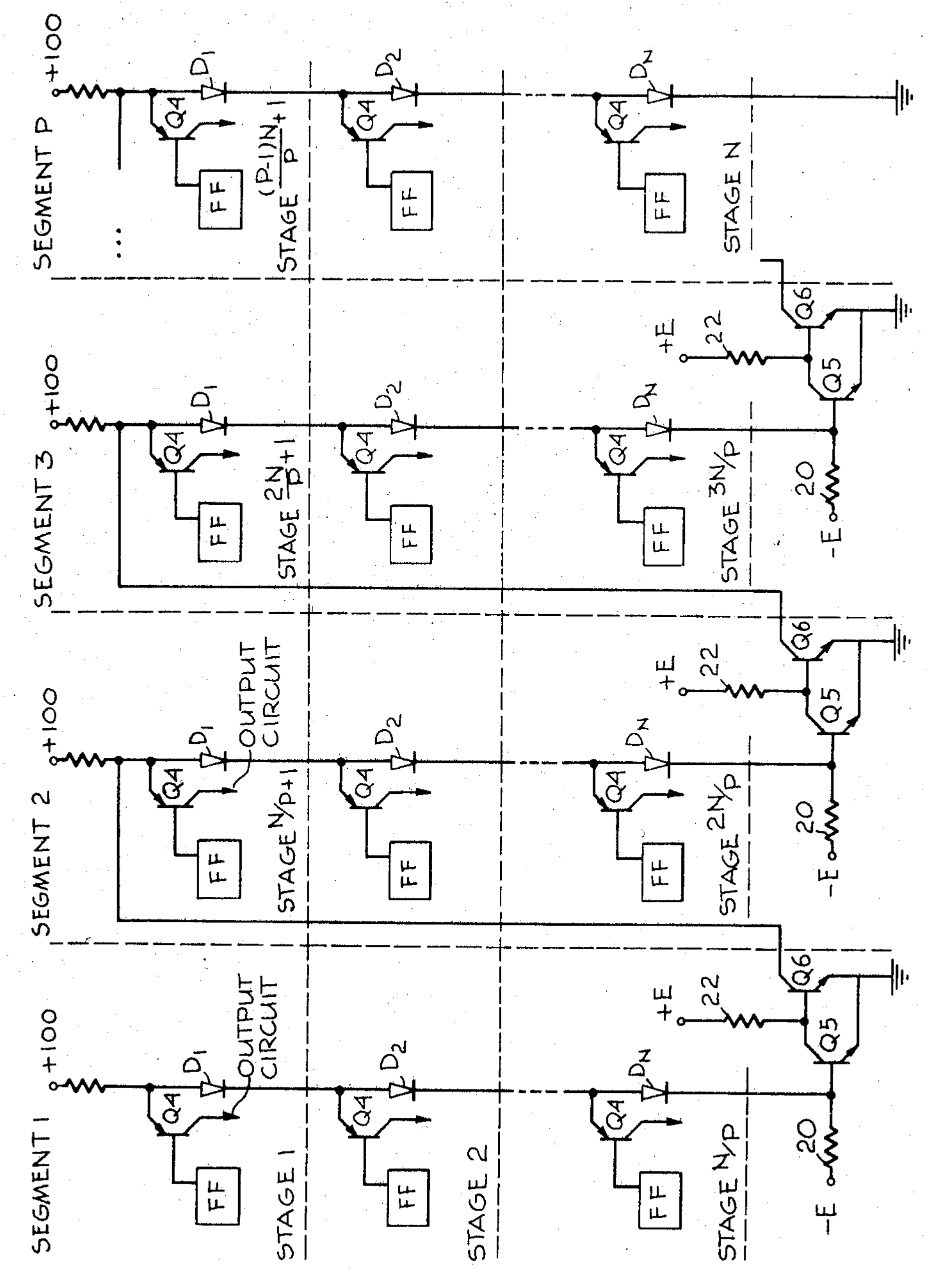
Figure 3:
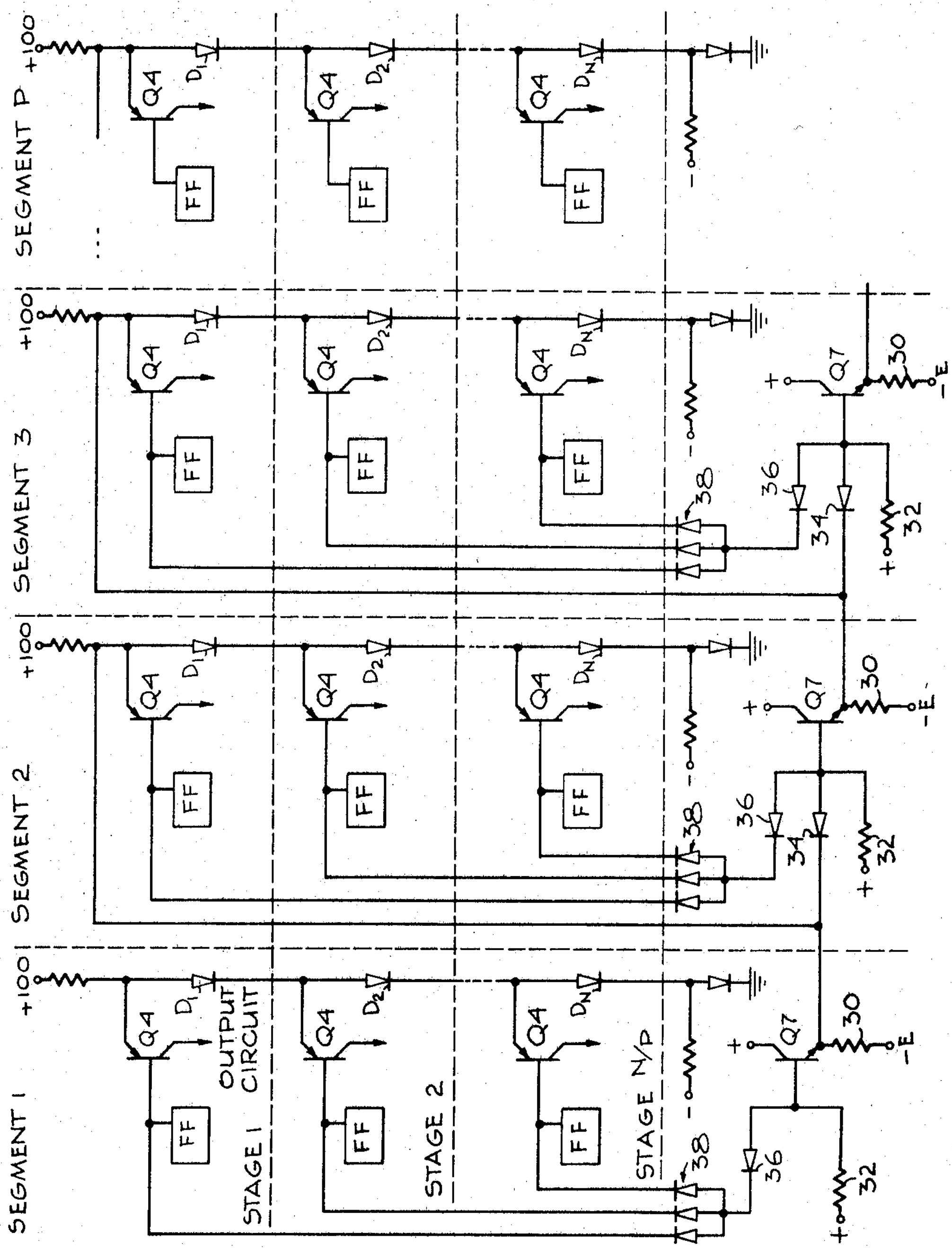

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIG. 1 is a schematic diagram of a plurality of stages of a selection device constructed in accordance with the present invention;

FIG. 1*a* illustrates a characteristic curve of a conventional diode;

FIG. 2 is a schematic diagram illustrating the manner in which a plurality of selection device segments can be cascaded; and FIG. 3 is a schematic diagram illustrating the manner in which a plurality of selection device segments can be cascaded such that those segments containing no binary elements in a given state are bypassed in a sequential consideration of the segments.

Attention is now called to FIG. 1 which schematically illustrates the selection device constructed in accordance with the present invention. As previously pointed out, it is often desirable, as in the use of content addressable memories, to be able to detect the presence or absence of pulses on conductors and then in response to such detected information provide output signals for performing different tasks.

Assume for example, that each of a plurality of conductors 10 (respectively arbitrarily numbered $\mathbf{10_1}$, $\mathbf{10_2}$ . . . $\mathbf{10_N}$) constitutes a word line of a content addressable memory (not shown). In accordance with the previously mentioned U.S. Patent 3,031,650, pulses are provided on the respective word lines when bits stored in the locations associated with the word lines are not identical with corresponding bits of a search word. The selection device herein is provided to select those conductors 10 on which no pulses appear and subsequently provide signals to perform different operations in accordance with which ever conductors were selected. The selection device includes a plurality of stages N equal in number to the number of conductors 10. Inasmuch as all of the stages are substantially identical, a detailed discussion will be directed only toward stage 1 and its relationship with the other stages.

Stage 1 includes a binary element, in this case a bistable element, comprising a flip-flop circuit including transistors Q1 and Q2. The emitters of each of transistors Q1 and Q2 are grounded. The base of transistor Q1 is connected to conductor $\mathbf{10_1}$ while the base of transistor Q2 is connected directly to the collector of transistor Q1 and through a resistor R3 to a source of positive potential (+E). The collector of transistor Q2 is connected through a resistor R4 to the source of positive potential (+E) and through a resistor R2 to the base of transistor Q1. The base of transistor Q1 is additionally connected through a resistor R1 to a source of negative potential (—E).

In addition to the transistors Q1 and Q2 comprising the bistable circuit, transistors Q3 and Q4 are provided. The collector of transistor Q3 is connected to the collector of transistor Q1 while the emitter thereof is connected directly to an advance pulse source 12, the purpose of which will be set forth hereafter. The base of transistor Q3 is connected through a capacitor C1 to ground and through a resistor R5 to a source of negative potential (−E). The base of transistor Q4 is connected to the collector of transistor Q2 while the collector of transistor Q4 is connected through resistor R5 to a source of negative potential (−E). The emitter of transistor Q4 is connected to a tap $T_1$ which in turn is connected to the anode of a diode $D_1$. As will be more readily appreciated below, the tap and emitter-collector path of transistor Q4 can be considered to comprise an output circuit controllable by the bistable circuit to which it is connected.

Diode $D_1$ is connected in a series circuit which includes one diode from each of the stages. A positive potential source, nominally shown as +100 volts, is connected through a resistor 14 to the anode of the diode $D_1$ of stage 1. The cathode of the diode $D_1$ is in turn connected to the anode of the diode $D_2$ of stage 2, the cathode of the diode $D_2$ to the anode of the diode $D_3$, etc. The cathode of the diode $D_N$ of stage N is connected to ground.

Attention is momentarily called to FIG. 1*a* which illustrates a typical characteristic curve of each of the diodes. Note that for a small voltage drop across a diode, that is below about 0.6 volt, the current through the diode is extremely small. On the other hand, when the voltage drop exceeds 0.6 volt, the current through the diode increases very rapidly. Although an appreciation of this characteristic is extremely significant to an understanding of the operation of this invention, it is to be understood that the quantitative value of 0.6 volt is not significant and the invention could function equally as well if the knee of the diode characteristic resided at some other voltage level.

In order to understand the operation of the invention, let it be initially assumed that the bistable elements in each stage are in a false state, i.e., with the transistors Q1 cut off and the transistors Q2 conductive. Let it then be assumed that the content addressable memory (not shown) performs a search and as a consequence a pulse is generated on conductor $10_N$, but that no pulses are generated on conductors $10_1$ and $10_2$. In accordance with the previous explanation, this should be understood to mean that the bit pattern stored in the content addressable memory location associated with the conductor $10_N$ was not identical to the search word being sought, while the bit patterns stored in the locations associated with conductors $10_1$ and $10_2$ were identical to the search word.

The pulse on line $10_N$ will forward bias transistor Q1 of stage N and as a result lower the potential on the base of transistor Q2 of stage N. As a consequence, transistor Q2 will be biased off. This action in turn causes the potential +E to be applied to the base of transistor Q4 of stage N which will accordingly be biased off.

On the other hand, inasmuch as no pulses appeared on conductors $10_1$ and $10_2$, transistors Q2 of stages 1 and 2 will respectively remain conductive. As a consequence, current I tends to flow from the +100-volt source connected to resistor 14 through transistors Q4 of both stages 1 and 2. Instead of the current I in resistor 14 flowing into transistors Q4 of both stages 1 and 2, however, substantially all of it will flow into transistor Q4 of stage 1 with no more than negligible amounts entering stage 2. That substantially all of current I will be restricted to stage 1 can be readily understood when it is realized that the potentials established at the emitters of transistors Q4 of both stages 1 and 2 will be equal to the sum of the emitter-base voltage drops of transistors Q4 and the collector-emitter voltage drops of transistors Q2 which will be slightly above ground potential. Inasmuch as the cathode of the diode $D_1$ is connected to the emitter of transistor Q4 of stage 2, it becomes apparent that the voltage drop across the diode $D_1$ will remain below 0.6 volt. Inasmuch as the diode characetristic in FIG. 1*a* clearly indicates that substantially no current is conducted through the diode when the forward voltage drop thereacross is below 0.6 volt, it follows that substantially the full current I will enter the emitter of transistor Q4 of stage 1.

The critical concept regarding the steering of the current I lies in the substantially identical characteristics of the transistors Q2 and Q4 of stages 1 and 2. In the worst case, that is when both the emitter-base voltage drop of transistor Q4 of stage 1 and the collector-emitter voltage drop of transistor Q2 of stage 1 are a maximum and both the emitter-base voltage drop of transistor Q4 of stage 2 and the collector-emitter voltage drop of transistor Q2 of stage 2 are a minimum, proper current steering will occur so long as the sum of the maximum voltage drops exceeds the sum of the minimum voltage drops by less than 0.6 volt. Consequently, realizing that the current steering scheme described operates satisfactorily when transistors Q2 are conductive in adjacent stages, it should be apparent that the steering will work even better when the stages in which transistors Q2 are conductive are separated by stages in which transistors Q2 are not conductive. This is so because an integral multiple of 0.6-volt drops would be necessary to forward bias all the diodes between conductive stages.

If desired, instead of connecting the cathode of the diode of stage N to ground, it could be connected to a negative potential source in order to force a small amount of current through the series circuit to thereby bias the diodes so as to effectively shift the characteristic curve of FIG. 1*a* slightly closer to the vertical or current axis. This will slightly change the steering criterion. That is, instead of it merely being necessary that the maximum voltage drops across transistors Q2 and Q4 of stage 1 be less than 0.6 volt greater than the minimum voltage drops across transistors Q2 and Q4 of stage 2, it may be necessary that the maximum voltage drops be no greater than, for example, 0.3 volt greater than the minimum voltage drops.

When current I is diverted from the series diode circuit into one of the taps, it will saturate the transistor Q4 connected to the tap and consequently raise the potential of the collector of transistor Q4 and the output line 16 connected thereto to substantially ground. Thus, the transistor Q4 collector voltage can be used to initially identify the first or lowest numbered conductor 10 on which no pulse appeared. Each of the output lines 16 can drive an encoder network 17 to thereby generate address signals identifying a particular conductor.

To sequentially generate address code signals identifying all the conductors 10 on which no pulse appeared, use can be made of the advance pulse source connected to the emitter of transistor Q3. The generation of a negative advance pulse by source 12 forward biases transistor Q3 of the stage in which transistor Q4 is conducting since the collector potential of the conductive transistor Q4 will be at ground level. It should be clear that all other transistors Q3 will be off biased inasmuch as the collectors of all nonconductive transistors Q4 will reside at substantially −E.

Conduction of transistor Q3 effectively deprives transistor Q2 of base current and consequently off biases transistor Q2, thereby on biasing transistor Q1. The capacitor C1 is provided to prevent the development of a race condition which might permit the bistable elements of two stages to be reset during the same advance pulse. By connecting the capacitor C1 between the base of transistor Q3 and ground, the base voltage of transistor Q3 is prevented from changing extremely fast in both the stage in which transistor Q4 is presently conducting and the stage in which conduction will subsequently be initiated. Use of the capacitor C1 therefore somewhat relieves the critical nature of the duration of the advance pulse.

In order to further avoid a race condition from developing, the +100-volt source could be disconnected from the series diode circuit for the duration in which the advance pulse is being applied to the transistors Q3. The capacitor C1 of the stage in which transistor Q4 had been previously conducting will be sufficiently charged to forward bias the transistor Q3 when the advance pulse is applied even in the absence of current I flowing through transistor Q4.

From the foregoing, it should be appreciated that a selection device has herein been disclosed which permits current to be steered in accordance with the states of bistable elements so as to permit coded address signals to be generated identifying only one, arbitrarily the lowest numbered, of a plurality of bistable elements in a given state. Additionally, it has been shown that by properly applying an advance pulse to all of the stages of the selection device, coded address signals can be sequentially generated to thereby sequentially identify all of the bistable elements in a given state.

From the nature of the current steering previously described, it should be apparent that a very definite upper limit exists regarding the number of stages that can be interconnected in the manner shown in FIG. 1. More particularly, if N is too large a number, when current I is being conducted through transistor Q4 of stage N, there may be a sufficient voltage buildup across the diodes of all of the stages to thereby forward bias transistor Q4 of stage 1 even if transistor Q2 of that stage were not conducting. In order to prevent such an occurrence, it is essential that the number of diodes connected together in the same series circuit be limited.

For example, by establishing the upper limit of N at 16, the potential at tap $T_1$ is restricted to a variation between approximately 0 and 10 volts. This permits the potential +E at the collector of transistor Q2 to be easily established at a high enough value to assure that transistor Q4 of stage 1 remains nonconductive when transistor Q4 of stage N conducts. Additionally, the relatively small voltage excursion range at tap $T_1$ assures that current I remains substantially constant regardless of which stage conducts.

Where the number N is large, instead of connecting the diodes of all of the stages in a single series circuit, the stages can be segmented into P segments such that each of the segments will include N/P stages. As shown in FIG. 2, adjacent segments can then be interconnected by the utilization of a coupling circuit including transistors Q5 and Q6. For example, in the coupling circuit of segment 1, the collector of transistor Q5 and the base of transistor Q6 are connected through a resistor 22 to a source of positive potential (+E). The emitters of transistors Q5 and Q6 are grounded and the collector of transistor Q6 is connected to the resistor 14 of segment 2. The base of transistor Q5 is connected to the cathode of stage N/P of segment 1 and through resistor 20 to a negative potential source (−E). So long as current I is being diverted through any of the taps connected to the series circuit of segment 1, the potential on the base of transistor Q5 will be below ground, and accordingly, transistor Q5 will be off biased. As a consequence, the base of transistor Q6 will be positive and the transistor will be forward biased so as to draw all of the current from resistor 14 of segment 2 therethrough. More particularly, when transistor Q6 of segment 1 is conductive, current I is prevented from being diverted from the series circuit of segment 2 into any of the taps connected thereto. On the other hand, if current I is not diverted into any of the taps in segment 1 and instead flows through resistor 20, the potential established on the base of transistor Q5 of segment 1 will be sufficiently positive to forward bias transistor Q5 and as a consequence off bias transistor Q6 to thereby cause current I to be applied to the series diode circuit of segment 2.

Inasmuch as the number of segments utilized may be large and the number of conductors 10 upon which no pulse appears may be small, a technique is illustrated in FIG. 3 for interconnecting segments so as to eliminate the current propagation time through the series diode circuit of segments whose bistable elements all have been switched to a true state, that is, where transistor Q1 is conducting. More particularly, a transistor Q7 is connected between segments with the emitter thereof being connected through a resistor 30 to a negative potential. The collector of transistor Q7 is connected to a positive potential source while the base of transistor Q7 is connected through a resistor 32 to a positive potential source, through a diode 34 to the emitter of a transistor Q7 of a previous segment, and to a diode 36 which in turn is connected through a plurality of diodes 38 each of which is connected to the bistable element in a different stage. More particularly, the cathodes of diode 38 can be respectively connected to the collectors of different transistors Q2.

In operation, when the base of transistor Q7 of segment 2 is at a high potential, a substantial amount of current will be conducted therethrough, and as a consequence, its emitter voltage will be at a positive potential thereby allowing current I through the series diode circuit of segment 3. On the other hand, when the base of transistor Q7 of segment 2 is at a low potential, its emitter will be at a much lower potential and current I will not flow through the series diode circuit of segment 3 but instead will be driven through the resistor 30 of segment 2.

It is apparent that so long as any bistable element in a segment is in a false state, current conduction through the series diode circuit of a subsequent segment should be prevented. However, when all the bistable elements of a segment are in a true state, the current I should be driven through the series diode circuit of the subsequent segment only if bistable elements in a false state exist therein.

Assume that address code signals identifying the last bistable element in a false state in the segment 1 have just been generated, and as a consequence, a positive voltage is applied to the base of transistor Q7 of segment 1. Consequently, a positive potential will be applied to the cathode of diode 34 of segment 2. If all of the bistable elements in segment 2 are in their true state, that is, with transistor Q1 conducting and the collector of transistor Q2 at a high potential, transistor Q7 of segment 2 will be caused to immediately conduct heavily regardless of the amount of time it takes the current I to propagate through the series diode circuit of segment 2. On the other hand, then assume that at least one of the bistable elements of segment 3 is in a false state, that is, with transistor Q2 conducting so that its collector is at a low voltage level. As a consequence, the emitter of transistor Q7 of segment 3 will remain at a low voltage level until the false bistable element in segment 3 is switched to a true state. So long as the emitter of transistor Q7 is at a low voltage level, the current I is prevented from flowing in the series diode circuit of segment 4.

From the foregoing, it should be apparent that a selection device has been provided herein which enables each of M bistable elements in a given state, of a total number of N such elements, to be selected in M finite time periods.

The embodiments of the invention in which an exclusive property or privilege is claimed are defined as follows:

1. A current steering circuit comprising:
a series circuit including at least one diode;
reference potential means for driving a current through said series circuit;
first and second taps respectively connected to the anode and cathode of said diode;
first and second identical conduction paths respectively connected to said first and second taps;
each of said first and second conduction paths including a selectively conductive switch; and
means establishing a potential across said diode insufficient to forward bias it when current is diverted from said series circuit into said first conduction path.

2. A current steering circuit comprising:
a series circuit including a plurality of similarly poled unidirectional current conducting elements, each coupled between a different pair of first and second terminals;
reference potential means for driving a current through said series circuit;
a plurality of substantially identical switching paths each coupled to a different one of said first terminals;
means causing selected ones of said switching paths to be conductive tending to divert current from said series circuit therethrough; and
means responsive to current diverted from said series circuit through one of said switching paths for establishing a potential at the first terminal coupled thereto insufficient to forward bias the unidirectional current conducting element coupled thereto.

3. The circuit of claim 2 wherein each of said unidirectional current conducting elements comprises a diode having an anode and a cathode respectively connected to said first and second terminals.

4. The circuit of claim 3 wherein each of said switching paths includes a transistor switch having a base, a collector, and an emitter; and means connecting each of said transistor switch emitters to a different one of said first terminals.

5. The circuit of claim 4 wherein said means causing selected switching paths to be conductive includes a plurality of binary elements, each capable of defining first and second states; and means coupling each of said binary elements to a different one of said transistor switches for rendering it conductive in response to the binary element coupled thereto defining a first state.

6. The circuit of claim 5 wherein said potential means includes means respectively coupling first and second reference potentials to opposite ends of said series circuit; and wherein said means responsive to current diverted from said series circuit into one of said switching paths includes means establishing a potential substantially equal to said second reference potential at the first terminal coupled thereto.

References Cited

UNITED STATES PATENTS

| | | | |
|---|---|---|---|
| 2,840,726 | 6/1958 | Hamilton | 307—259 |
| 3,137,839 | 6/1964 | Rubin | 340—146.2 |
| 3,138,760 | 6/1964 | Gilbert | 328—169 |
| 3,135,876 | 6/1964 | Embree | 307—252 |
| 3,289,159 | 11/1966 | Woodward | 307—317 |

JOHN S. HEYMAN, Primary Examiner

H. A. DIXON, Assistant Examiner

U.S. Cl. X.R.

307—235, 317; 340—347